United States Patent [19]

Liang et al.

[11] Patent Number: 4,805,116

[45] Date of Patent: Feb. 14, 1989

[54] INTERPOLATED DISPLAY CHARACTERISTIC VALUE GENERATOR

[75] Inventors: Bob C. Liang, West Hurley; Jorge Gonzalez-Lopez, Red Hook, both of N.Y.

[73] Assignee: International Business Machines Corporation, Armonk, N.Y.

[21] Appl. No.: 854,965

[22] Filed: Apr. 23, 1986

[51] Int. Cl.$^4$ ............................................. G06F 7/66
[52] U.S. Cl. ................................. 364/521; 340/728; 340/747
[58] Field of Search ............... 364/522, 521; 340/728, 340/729, 732, 740, 747; 358/80

[56] References Cited

U.S. PATENT DOCUMENTS

| | | | |
|---|---|---|---|
| 4,538,144 | 8/1985 | Yamagami | 340/747 |
| 4,586,038 | 4/1986 | Sims et al. | 340/729 |
| 4,609,917 | 9/1986 | Shen | 340/729 |
| 4,626,838 | 12/1986 | Tsujioka et al. | 340/744 |
| 4,648,049 | 3/1987 | Dines et al. | 364/521 |
| 4,677,573 | 6/1987 | Brown et al. | 364/521 |
| 4,697,178 | 9/1987 | Heckel | 340/729 |

OTHER PUBLICATIONS

"Incremental Linear Interpolation", Dan Field, ACM Transactions on Graphics, vol. 4, No. 1, Jan. 1985, pp. 001-011.

Primary Examiner—Gary V. Harkcom
Assistant Examiner—Mark K. Zimmerman
Attorney, Agent, or Firm—Mark S. Walker; George E. Clark; J. Dennis Moore

[57] ABSTRACT

Method and apparatus for providing interpolated display characteristic values, such as intensity or Z value, for pels within a polygon to be displayed by a computer graphics display system. A scanning sequence generates pel addresses such that each pel address so generated is contiguous with a previously generated pel address. The parametric value rate of change in both the X and the Y direction is determined, and expressed as an integer value and a remainder quantity. The remainder quantity is used to determine a sequence, driven by pel address changes, by which the integer parametric value increment from pel to pel is incremented or decremented by one in a regular sequence that assures that the error in the computed parametric value for each pel never exceeds 0.5 parametric value units.

2 Claims, 9 Drawing Sheets

| CASE # | | Ya | Yb | Yc | T | Q1 | Q2 | Q3 | A | B | C | D | E |
|---|---|---|---|---|---|---|---|---|---|---|---|---|---|
| 1 |  | Ymin | Ymax | — | X | A | B | C | 0 | 0 | 0 | 0 | 1 |
| 2 |  | Ymin | Ymax | Ymin | X | A | B | C | 1 | 0 | 0 | 0 | 1 |
| 3 |  | Ymin | Ymax | Ymax | X | A | B | C | 0 | 1 | 0 | 0 | 1 |
| 4 |  | Ymax | Ymin | — | X | A | B | C | 0 | 0 | 0 | 1 | 1 |
| 5 |  | Ymax | Ymin | Ymin | X | A | B | C | 0 | 1 | 0 | 1 | 1 |
| 6 |  | Ymax | Ymin | Ymax | X | A | B | C | 1 | 0 | 0 | 1 | 1 |
| 7 |  | — | Ymin | Ymax | X | C | B | A | 0 | 0 | 0 | 0 | 0 |
| 8 |  | Ymin | Ymin | Ymax | X | C | B | A | 0 | 1 | 0 | 0 | 0 |
| 9 |  | — | Ymax | Ymin | X | C | B | A | 0 | 0 | 0 | 1 | 0 |
| 10 |  | Ymax | Ymax | Ymin | X | C | B | A | 0 | 1 | 0 | 1 | 0 |
| 11 |  | Ymin | — | Ymax | <0 | C | A | B | 0 | 0 | 1 | 0 | 0 |
| 12 |  | Ymin | — | Ymax | >0 | A | C | B | 0 | 0 | 1 | 0 | 1 |
| 13 |  | Ymax | — | Ymin | <0 | A | C | B | 0 | 0 | 1 | 1 | 1 |
| 14 |  | Ymax | — | Ymin | >0 | C | A | B | 0 | 0 | 1 | 1 | 0 |

| DIR 1 | S1 | | INCREMENT | |
|---|---|---|---|---|
| | | | D>=0 | D<0 |
| 0 | X | | 0 | 0 |
| +1 | 0 | | H1+1 | H1 |
| +1 | 1 | | -H1-1 | -H1 |
| -1 | 0 | | -H1-1 | -H1 |
| -1 | 1 | | H1+1 | H1 |

| DIR 2 | S2 | FLAG 4 | INCREMENT | |
|---|---|---|---|---|
| | | | D>=0 | D< 0 |
| 0 | X | X | 0 | 0 |
| +1 | 0 | 0 | H2+1 | H2 |
| +1 | 1 | 0 | -H2-1 | -H2 |
| -1 | 0 | 0 | -H2-1 | -H2 |
| -1 | 1 | 0 | H2+1 | H2 |
| +1 | 0 | 1 | H2 | H2+1 |
| +1 | 1 | 1 | -H2 | -H2-1 |
| -1 | 0 | 1 | -H2 | -H2-1 |
| -1 | 1 | 1 | H2 | H2+1 |

FIG. 13

INTERPOLATED DISPLAY CHARACTERISTIC VALUE GENERATOR

BACKGROUND OF THE INVENTION

1. Field of the Invention

The present invention relates to computer graphics generation and display, and more particularly to a method and apparatus for providing the interpolated display characteristic values of pels within a polygon to be displayed.

2. Description of the Background Art

Computer Graphics display systems are computer systems which generate and display graphic images on a raster scan display device. Such graphic images are derived from digital data stored in the system's memory. The data is typically stored in the form of points in a two or three-dimensional coordinate system, wherein the points correspond to the vertices of polygons, such as triangles. The polygons form the "building blocks" of larger objects which are the ultimate display objects. Also stored with the vertex data are parametric values, i.e., intensity, or other values that permit computation of intensity such as surface color, surface reflectivity, transparency, light sources, and normal vectors.

For a given object, this data is stored in the form of a list of instructions, called a "display list". To convert such a display list to an actual image on a raster scan display, a display processor is provided which reads the list from memory, processes the data, and then writes raw pel data to a frame buffer. In raster scan real time the frame buffer is read, and the resulting data stream is converted to an analog video signal which is sent to the display device.

The present invention relates to a function provided in the display processor portion of such computer graphic systems. Specifically, the invention relates to the generation of data relating to a third parametric value for all pel values of a displayed triangle, based on the position of the pels and on other data relating to the third parameter. For example, in the so-called shading problem shading information for a given triangle may be provided to the display processor in the form of the light intensity of the vertices of the triangle. Alternatively, the display processor may be provided the parameters of the object surface, the surface orientation, and the specified light model. The display processor must then, for each pel associated with the triangle, compute a light intensity value based on the values provided.

Prior art approaches to the shading problem generally involve "Gouraud shading" implemented in connection with polygons. For example, in one approach the intensity of points on the polygons are computed in two steps. First, the intensities of all pels associated with each edge are computed as a function of the edge end points (vertices) usng one-dimensional linear interpolation. Then, the intensity of pels in each row (or column) belonging to the polygon is computed as a function of the previously computed intensities, interpolating between two end (edge) points. It will be understood that intensity in this context refers to the brightness of pels, if the object is in grey scale (monochrome) or to R, G, and B values, if the object is in color.

Another example is described in "A 3-D Graphic Display System With Depth Buffer and Pipeline Processor," by A. Fujimoto, et al, IEEE CG & A, (June 1984), page 11. According to the approach described therein, elemental display polygons are first "tesselated", or divided into triangles. This ensures that the triangle being dealt with defines a unique plane. The intensity of each pel is obtained by applying the aforementioned linear interpolation method, the intensity of each pel being obtained from the intensity of previous, contiguous pels by the addition of a fixed, incremental quantity for an X move, and another fixed incremental quantity for a Y move.

A problem with the Fujimoto approach is that the arithmetic precision to represent the increments must be high enough to prevent an excessive accumulation error buildup when the process is repetitively applied to all points of the triangle.

Another example of the function to which the present invention relates is the computation of the Z values of each pel associated with a triangle, based upon the X, Y and Z values of the vertices of the triangle. The prior art approaches to the computation are basically the same as the previously described approach to the computation of the intensity value for each point on a triangle.

The most important disadvantage of these prior art approaches is the lack of accuracy in the computed intensities (or Z values) due to the quantization of the X and Y coordinates or error accumulation. In practical raster scan computer graphics systems, lines defining edges are not always true straight lines. The position of a point on a triangle edge may diverge from its theoretical position and, therefore, the computed intensity may depart from its correct value.

The present invention solves this problem and provides the intensity of each point on the polygon with an error that never exceeds 0.5 intensity units. Additionally, this improvement is provided by way of a method and apparatus that offers increased performance over prior art approaches. Further, the invention has application to the determination of other quantities, such as Z values for pels.

SUMMARY OF THE INVENTION

The present invention provides an improvement for a computer graphics display processing system of the kind having a memory, a display processor, and a raster scan display for displaying graphics objects. Such systems represent graphics objects in memory by way of position data which corresponds to the positions of vertices of planar polygons which together make up the graphics objects. Parametric values corresponding to a display characteristic are also provided in association with the vertex position data. The invention provides a method for providing interpolated display characteristic parametric values for each pel on the raster scan display associated with the polygon to be displayed, and comprises the following steps.

A sequence order is determined for the vertices of the polygon. A scanning sequence of pel addresses is generated, starting at the first of the sequenced vertices, such that each pel address so generated is contiguous with the previously generated pel address. A set of values related to a desired parametric value rate of change is then determined by the following three steps. First, a first integer value rate of change is determined that is in approximation of a first desired parametric value rate of change, with respect to a first axis in the display plane. Second, a second integer rate of change is determined that is in approximation of a second desired parametric rate of change, with respect to a second axis, orthogonal to said first axis, in the display plane. Third, a pel address change driven sequence is determined for temporarily incrementing or decrementing, as the case may be, the first and second integer rates of change by 1, to correct accumulated error due to previous contiguous pel parametric value determinations based on the first and second integer value rates of changes, before the accumulated error becomes greater than 0.5 parametric value units, in either axis direction. Finally, the parametric value for each pel address is generated, based on the first and second integer value rates of change and on the pel address change driven sequence, thus maintaining the accumulated error in parametric value determinations less than or equal to 0.5 parametric value units.

The present invention significantly reduces intensity errors in the linear interpolation of display characteristic parametric values, such as light intensity, or shading, in a computer graphics raster scan display system. By eliminating prior art interpolation between edges, hardware setup is greatly simplified as compared with prior art approaches. Further, the method significantly reduces the number of quotient bits in division operations associated with the method, significantly speeding up the setup procedure.

The foregoing and other advantages, objects and features of the invention will be apparent from the more particular description of the preferred embodiment of the invention, as illustrated in the accompanying drawings.

DETAILED DESCRIPTION OF THE PREFERRED EMBODIMENT

Figure 1:
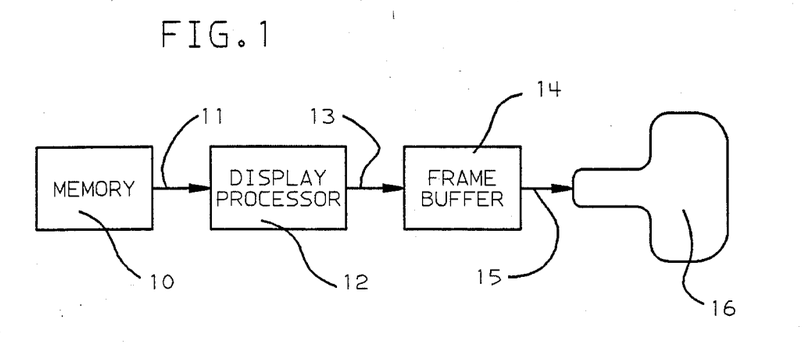
FIG. 1 is a block diagram of a computer graphics system.

FIG. 1 is a simplified block diagram of a computer graphics system. It includes a memory 10, which provides instructions on a line 11 to a display processor 12. The display processor operates on the instructions from memory 10 to generate pel values corresponding to graphics objects to be displayed, which are provided on a line 13 to a frame buffer 14. The pel values stored in frame buffer 14 are read out in raster scan fashion and provided on a line 15 to a suitable display device 16. Such systems are well known in the art.

Figure 2:
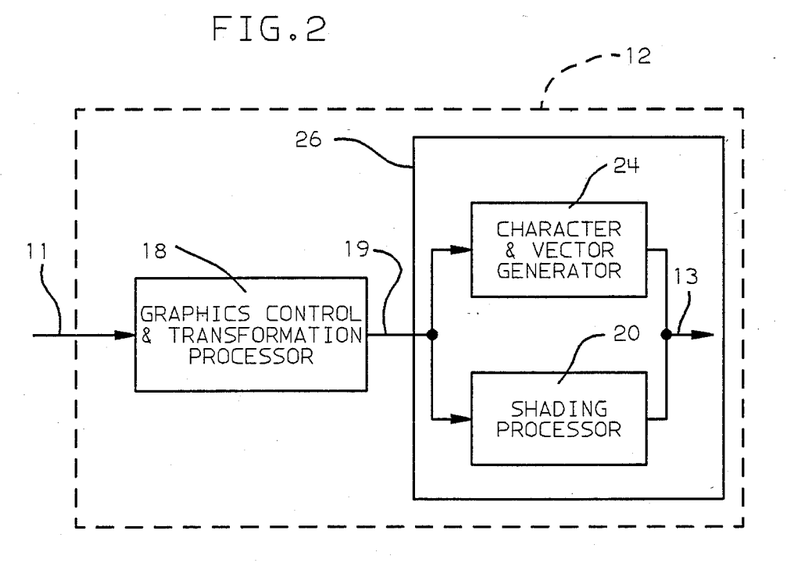
FIG. 2 is a block diagram of the display processor of FIG. 1.

FIG. 2 is a more detailed block diagram of the display processor 12 of FIG. 1. As shown, a graphics control and transformation processor 18 receives the data on line 11 from memory 10 (FIG. 1) and provides an output on line 19 to a drawing processor 26, which includes a character to vector generator 24 and shading processor 20. The character and vector generator 24 generates pel values for alphanumeric characters and vectors. The shading processor 20 generates pel values for polygons for which vertex and other data is provided on line 19. The preferred embodiment of the present invention is implemented in connection with shading processor 20. The output of shading processor 20 is applied on line 13 to the frame buffer 14 (FIG. 1). The shading processor may include means for determining Z values for hidden surface removal by way of a subsequent depth buffer and associated logic.

Before describing in more detail the circuitry in shading processor 20, and its manner of operation, a general description of the graphic display problem with which the invention is concerned is illustrated in connection with FIG. 3.

Figure 3:
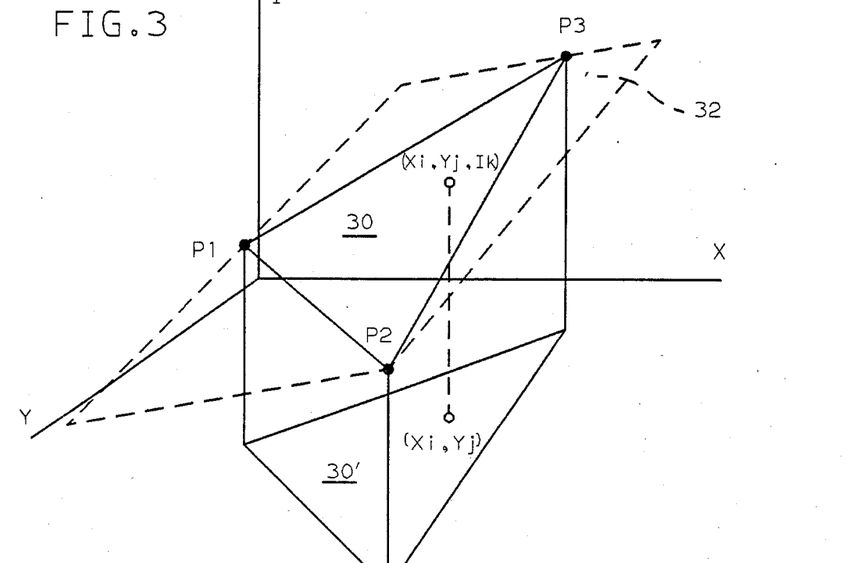
FIG. 3 is a graph showing a geometric representation of a display triangle.

FIG. 3 is a graph showing a triangle 30 defined by three points P1, P2 and P3 in a three-dimensional coordinate system X, Y, I, that helps to illustrate the problem solved by the invention. Triangle 30 of FIG. 3 will be considered in the context of axes I representing the intensity coordinate for a monochrome graphics display. I could also represent R, G, or B in the case of color rendering, or to Z for depth computation.

Vertices P1, P2, P3, define a plane 32, which may be called the shading plane, in the X, Y, I space. The projection of triangle 30 onto the XY (screen) plane is a second triangle 30' which is the triangle to be shaded. Each point of triangle 30' corresponding to a pixel is filled with the intensity value given by the corresponding point in triangle 30 in the shading plane. Thus, for a pixel with coordinate $X_iY_j$ in triangle 30' the correct intensity value may be obtained by extending a line from point $X_iY_j$ parallel to axis I to locate the intersection $X_iY_jI_k$, on triangle 30. $I_k$ is the appropriate intensity value for this point.

Figure 4:
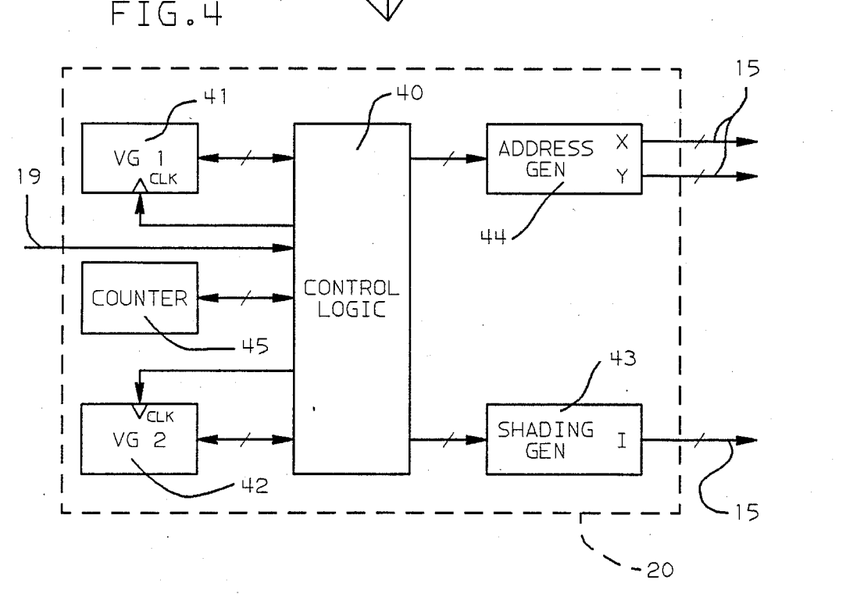
FIG. 4 is a block diagram of the shading processor of FIG. 2.

FIG. 4 is a block diagram showing in detail the structure of shading processor 20 of FIG. 2, implementing the preferred embodiment of the present invention. The output of the graphics control and transformation processor 18 (FIG. 2) is applied to a control logic unit 40. Two vector generators VG 41 and VG 42 are used to determine the edge of a triangle to be displayed. They implement a process in accordance with the Bresenham's algorithm. A shading generator 43 computes the interpolated intensities using a novel two-dimensional interpolation technique. An address generator 44 provides the X and Y coordinates corresponding to the intensities provided by shading generator 43. A counter 45 is used to keep control of the number of points that need to be shaded in each row. Control logic module 40 controls the entire process. A general purpose microprocessor (not shown), or other suitable means, assists in the setup of the circuitry in shading processor 20, in a manner made more clear below.

Figure 5:
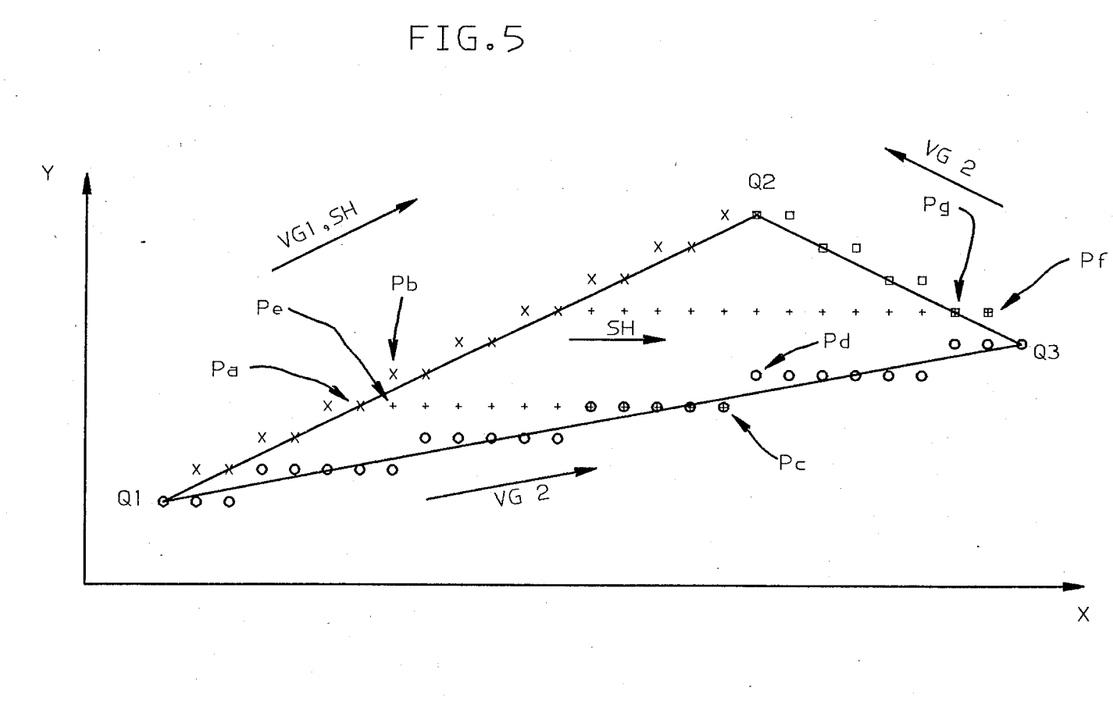
FIG. 5 is a geometric representation of the pels in a display triangle.

FIG. 5 assists in depicting graphically the process implemented by shading processor 20 of FIG. 4. The X and Y axes correspond to the row and column axes of the raster scanned by the display device of the system. Points Q1, Q2, and Q3 are the vertices of a triangle to be displayed.

In the first step of the method, the three points of the triangle to be displayed are sorted by microcode as a part of a setup procedure. The sorting algorithm is provided below. This algorithm is intended to satisfy the requirements of the control logic 40 and shading generator 43 (FIG. 4), described below under "Sorting Algorithm". In this example, Q1, Q2, and Q3 are already sorted, the Q-numbering corresponding to the sorting of the points. Also, shading generator 43 is initially set up to begin at point Q1. Its internal parameters are given by microcode just once per triangle. Those parameters do not change from row to row.

First, vector generator 41 is instructed to draw a line from Q1 to Q2. Also, vector generator 42 is instructed to draw a line from Q1 to Q3.

A two-dimensional shading algorithm is implemented in shading generator 43. It gives the intensity value of a point $(X_i, Y_j)$, i.e. $I(i,j)$, if the intensity corresponding to a contiguous point is known, i.e., $I(i,j-1)$, $I(i,j+1)$, $I(i-1,j)$, or $I(i+1,j)$. The two-dimensional shading algorithm is not reversible, in the sense that the result when moving from, say, point P1 to P2, may differ from the result when going from P2 to P1. This is similar to the behavior of the standard Bresenham's algorithm.

Shading generator 43 has two modes of operation: "Edge-Shading" mode and "Row-Shading" mode. In the "Edge-Shading" mode, shading generator 43 is driven by vector generator 41. Shading generator 43 stores the intensity and status of the just previously computed point by way of appropriate registers in its hardware, called here "backup registers". As vector generator 41 moves from Q1 to Q2, so does shading generator 43. During this process frame buffer 14 (FIG. 1) is being written. When vector generator 41 increments coordinate Y, it pauses. Referring to FIG. 5, assume that vector generator 41 has stopped on point Pb after having written point Pa.

Simultaneously, vector generator 42 had been computing from Q1 to Q3. When Y was incremented, vector generator 42 paused, at point Pd. Note that at this point in the process, points Pa and Pb have been shaded. Now, using backup registers, shading generator 43 starts shading from point Pe to point Pc using the intensity and status corresponding to point Pa as the initial point. This is the "Row-Shading" mode. Pc is the point corresponding to the end of the current run of vector generator 42. Note that in this example, Q3 is at the right side of the triangle, but it could also be at the left side, as is discussed more fully below.

When vector Q1Q3 is completed, vector generator 42 is instructed to draw vector Q3Q2. In this case, the slopes of Q3Q2 and Q1Q3 are of different signs. As a result, point Pg is the last computed point of the row of pels consisting of Pf and Pg which form that row's segment of vector Q3Q2. While computing vector Q1Q3, the right-most pel in each row's segment is the last computed pel. That last computed pel is also, in the case of vector Q1Q3, the last pel in that entire row for the triangle to be shaded. However, as vector Q3Q2 is computed, it is the first computed pel of that row's segment for the vector, in this case point Pf which is the end point for the row. This is taken into account in the initial setup procedure, as is explained more clearly below.

When vector generator 41 exhausts its points, the last row is shaded and the algorithm stops.

There are a few degenerated cases that occur when Q1Q3 or Q3Q2 are horizontal, i.e., when Y1=Y3, or when Y2=Y3. In those cases the end point for each row is given by just one vector, Q3Q2 or Q1Q3, respectively.

The actual equation of the shading plane defined by the three points $P_i(X_i, Y_i, I)$ (i=1,2,3) (FIG. 3), in the three-dimensional space (X,Y,I) is given by $$AX + BY + CI = D$$

where $$A = \begin{vmatrix} 1 & 1 & 1 \\ Y1 & Y2 & Y3 \\ I1 & I2 & I3 \end{vmatrix} = (I2 - I1)(Y2 - Y3) - (I2 - I3)(Y2 - Y1)$$

$$B = \begin{vmatrix} X1 & X2 & X3 \\ 1 & 1 & 1 \\ I1 & I2 & I3 \end{vmatrix} = (I2 - I3)(X2 - X1) - (I2 - I1)(X2 - X3)$$

$$C = \begin{vmatrix} X1 & X2 & X3 \\ Y1 & Y2 & Y3 \\ 1 & 1 & 1 \end{vmatrix} =$$

$$(X2 - X3)(Y2 - Y1) - (X2 - X1)(Y2 - Y3)$$

and $$D = \begin{vmatrix} X1 & X2 & X3 \\ Y1 & Y2 & Y3 \\ I1 & I2 & I3 \end{vmatrix}$$

The plane equation can be rewritten as $$I = \frac{dI}{dX} X + \frac{dI}{dY} Y + I0$$

where dI/dX and dI/dY are the partial derivatives, and I0 is the intensity value at (X=0, Y=0).

$$\frac{dI}{dX} = -\frac{A}{C}$$

$$\frac{dI}{dY} = -\frac{B}{C}$$

$$I0 = \frac{D}{C}$$

It can be shown that the absolute value of coefficients A, B and C are twice the area of the projection of the three-dimensional triangle onto planes (X=0), (Y=0), (I=0), respectively. This property is used in analyzing the dynamic range of the coefficients.

Note that a total of six multiplications are required to compute A, B and C.

Sorting Algorithm

Given three triangle vertices (called here Pa, Pb, and Pc), the sorting algorithm reorders them to form a new sequence (Q1,Q2,Q3) such that 1. vector generator 41 (and shading generator 43) run always from Q1 to Q2. Vector Q1Q2 determines the "start edge" of the Row-Shading process.
2. vector generator 42 determines the "end edge" Q1-Q3-Q2.
3. shading generator 43 moves always in the same X direction and in the same Y direction for all points in the triangle. This is a requirement of the shading algorithm.

Figure 6:
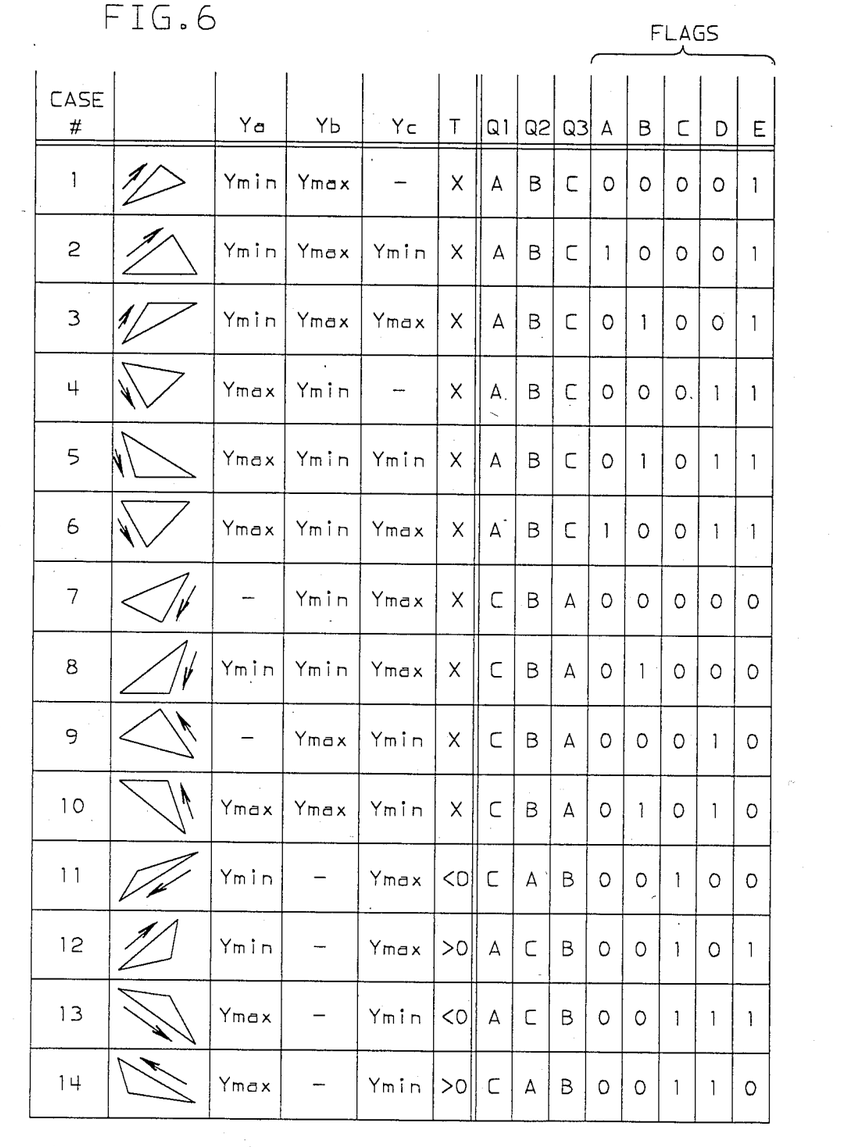
FIG. 6 is a table showing each of the fourteen different kinds of display triangles, and parameters associated therewith.

FIG. 6 is a table showing each of the fourteen possible different kinds of triangles that may be encountered, and showing various values and parameters relevant to the sorting algorithm. Columns 3 through 5 give the value of Ya, Yb, and Yc for each case assuming that Xa<Xb<Xc. In these columns, $$Ymin = minimum\ (Ya,Yb,Yc)$$

$$Ymax = maximum\ (Ya,Yb,Yc).$$

Column 6 gives the value of T used to distinguish between cases 11 through 14. T is defined as $$T=(Yb-Ya)(Yc-Ya)-(Yc-Ya)(Yb-Ya)$$

Note that two multiplications are required to compute T. However, T is equal to coefficient C, defined above, except for a possible sign difference. A procedure could be readily be devised, therefore to avoid multiplication.

Columns 7 through 9 gives the order of the output sequence. For example, case 12 gives Q1=Pa, Q2=Pc, and Q3=Pb.

Column 2 depicts a triangle corresponding to each case. The arrow defines the "start edge" and goes from Q1 to Q2.

Columns 10 through 14 defines the value of binary flags used by the shading algorithm. The flag values remain constant for the whole triangle.

Flag A is equal to one if vector Q1Q3 is horizontal. In that case the "end edge" is just vector Q3Q2.

Flag B is equal to one if vector Q3Q2 is horizontal. In that case the "end edge" is just vector Q1Q3.

Flag C is equal to one if the signs of the slopes of vectors Q1Q3 and Q3Q2 are the same.

Flag D is equal to one if the increment of X and the increment of Y as shading generator 43 moves have different signs.

Flag E is equal to one if the increment in X when shading generator 43 is in the "row-shading" mode is positive. (This is equivalent to say that the left edge is the "start edge" and that the right edge is the "end edge".

Sorting Procedure

The sorting procedure, implemented in microcode, is the following:

```
SORTX (P1,P2,P3):
    BEGIN
    Sort points by X     (i.e., Xa≦Xb≦Xc)
    Xmin=MIN(Xa,Xb,Xc)
    Xmax=MAX(Xa,Xb,Xc)
```
```
    Ymin=MIN(Ya,Yb,Yc)
    Ymax=MAX(Ya,Yb,Yc)
    FLAGC=0
    If Yb=Ymax
        THEN IF Ya=Ymin
            THEN sequence is (a,b,c)
            ELSE sequence is (c,b,a)
        ELSE IF Yb=Ymin
            THEN IF Ya=Ymax
                THEN sequence is (a,b,c)
                ELSE sequence is (c,b,a)
                        /* (Yb≠Ymin) & (Ya≠Ymax) */
            ELSE DO
                FLAGC=1
                T=(Xb-Xa)*(Yc-YA) - (Xc-Xa)*(Yb-Ya)
                IF Ya=Ymin
                    THEN IF T<0
                        THEN sequence is (c,a,b)
                        ELSE sequence is (a,c,b)
                    ELSE IF T>0
                        THEN sequence is (c,a,b)
                        ELSE sequence is (a,c,b)
                END
    IF Ya=Ymax
        THEN FLAGD=1
        ELSE IF (Ya=Ymin or Yc=Ymin)
            THEN FLAGD=0
            ELSE FLAGD=1
/*                                                   */
/* Let be (Q1(X1,Y1,I1), Q2(X2,Y2,I2), Q3(X3,Y3,I3)) the
    sorted sequence */
/*
    IF Y1=Y3
        THEN FLAGA=1
        ELSE FLAGA=0
    IF Y2=Y3
        THEN FLAGB=1
        ELSE FLAGB=0
    IF X1=Xmin
        THEN FLAGE=1
        ELSE FLAGE=0
END
```

Two-Dimensional Shading Algorithm

The computation of the intensity at each pixel is done by a modified Bresenham's algorithm that operates in both X and Y directions. In each step the algorithm computes the intensity value of a certain point if the intensity of its contiguous point (vertical or horizontal contiguity) is known. Note that two steps are required to go from point $(X_i, Y_j)$ to point $(X_i+1, Y_j+1)$. The shading algorithm is implemented in the hardware of shading generator 43 shown in FIG. 4.

To illustrate the rationale of the algorithm we will present first the one dimensional case. Then, the general, two-dimensional case will be described.

One-Dimensional Case

Horizontal line: If Y=Yq(constant), the plane equation takes the form $$I=(-A/C)*X+Ky$$

with $$I_y=IO+(-B/C)*Y_q$$

which gives the intensity value along the horizontal line Y=Yq.

Figure 7:
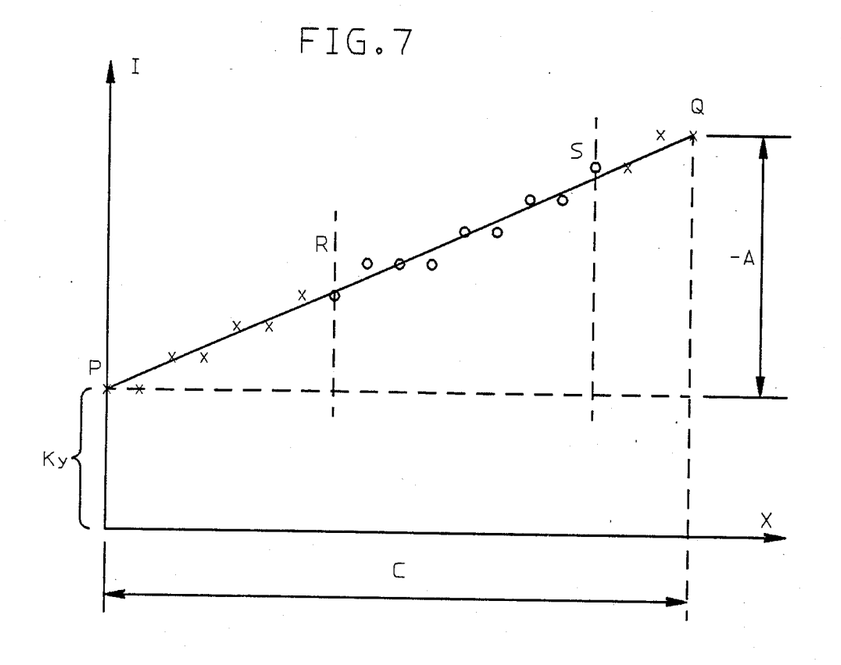
FIG. 7 is a graph of a line, illustrating the standard Bresenham's algorithm applied to the computation of I in one dimension.

If ABS(A/C)≦1, the intensity can be computed using the normal Bresenham's algorithm in the I-X plane as shown in FIG. 7. A vector drawn from point P to point Q then gives the intensity values for each X. Values (−A) and C are used to set up the algorithm. If one is interested in just the portion of the shading line from point R to point S, and the intensity corresponding to point R is known, the algorithm is set up in the same way, the only differences being the initial intensity value and the number of points. Note that the slope is given by A and C, which remains constant for all horizontal lines in the X-Y plane.

If ABS(A/C)>1, the Bresenham's algorithm cannot be used directly because I and X are not interchangeable. Note that for each X only one value of I must be computed. The Bresenham's algorithm would give several I values for the same X. Although one of them could be selected following some criterium, the algorithm would not be efficient due to the fact that several cycles would be required to compute the intensity corresponding to each X value.

The Bresenham's algorithm must be modified in the following way. let us assume $C>0$, $(-A)\geq 0$, and $(-B)>0$. Let be $$A1 = \text{FLOOR}(-A/C)$$

$$A2 = (-A) - A1*C \text{ (i.e., the remainder)}$$

FLOOR ( ) is defined as the integral part of ( ).

For each point the intensity is equal to the intensity of the previous point incremented by A1 (A1+1). The decision is taken by the Bresenham's algorithm in which the quantity A2 takes now the role of $(-A)$. Note that the previous case can be reduced to this one if A1=0. The line slope is made up of two terms: an integral part and a fractional part. The fractional part is handled by the Bresenham's algorithm. The integral part is always added to the current intensity from one point to the next.

Using a similar formulation we can write $$A3 = \text{CEIL}(-A/C)$$

$$A4 = AC*3 - (-A) \text{ (i.e., the remainder)}$$

CEIL ( ) is defined as the closest integer greater than or equal to ( ).

The intensity at each pint is equal to the intensity of the previous point plus A3 or (A3−1). Note that $$A2 + A4 = C$$

The quantity A4 takes the place of $(-A)$ of the first case presented.

The selection of the A1-A2 or A3-A4 formulations is not arbitrary. The appropriate decision will be illustrated below when presenting the two-dimensional case. Vertical Line: If the line to be shaded is vertical instead of horizontal, a similar reasoning can be followed. If X=Xp (constant), then $$I = (-B/C)*Y + Kx$$

with
$$Kx = I0 + (-A/C)*Kp$$

and $$B1 = \text{FLOOR}(-B/C)$$

$$B2 = (-B) - B1*C$$

$$B3 = \text{CEIL}(-B/C)$$

$$B4 = B3*C - (-B)$$

Note that $$B2 + B4 = C$$

Two-Dimensional Case

The case of an arbitrary line in the X-Y plane can be thought as a combination of the previous cases. When going from point $(X_i, Y_j)$ to point $(X_i+1, Y_j+1)$, the algorithm goes to $(X_i+1, Y_j)$ (or to $(X_i, Y_j+1)$), and from this point to $(X_i+1, Y_j+1)$.

The movement in X must be in the same direction for all points on the triangle. The same applies for Y.

As it was mentioned, the intensity increment when going from a point to the next can be considered as the contribution of an integral part and a fractional part. The fractional part contributes by 0 or 1, or by −1 or 0 to the intensity increment. It is important that for the whole triangle and for both X and Y directions the contribution of the fractional part be of the same sign, i.e. always 0 or 1, or always −1 or 0. This condition can be satisfied by choosing the appropriate formulation (A1-A2 or A3-A4 for X moves; or, B1-B2 or B3-B4 for Y moves) on one of the two axes and by assuring that the X move is always in the same direction (either positive or negative). The same applies for Y.

Description of the Algorithm

Figure 8:
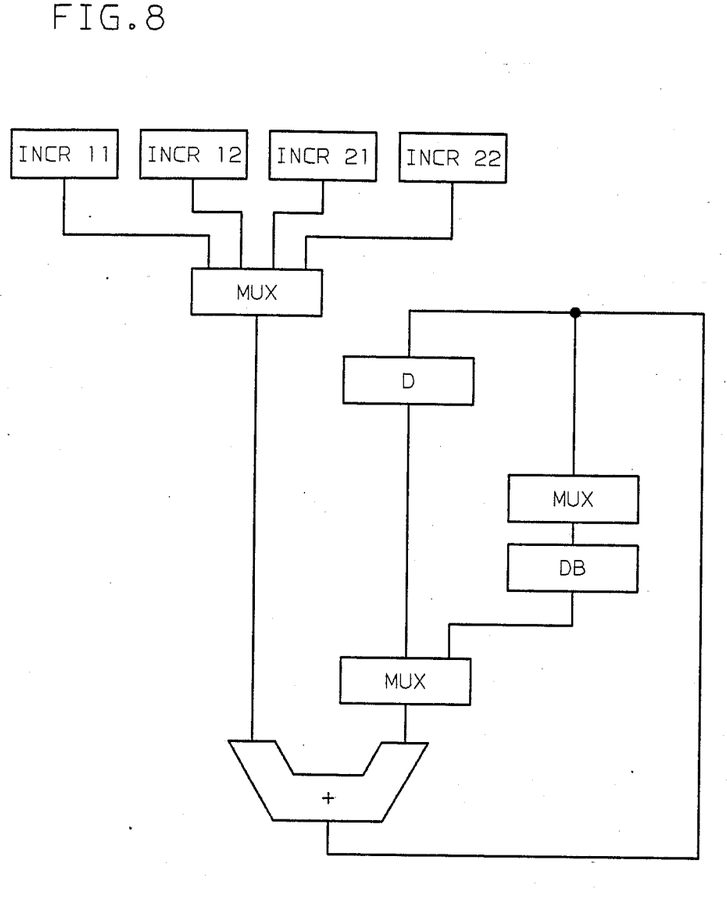
FIG. 8 is a diagram of the logic elements of the decision-taking section of the shading generator of FIG. 4.
Figure 9:
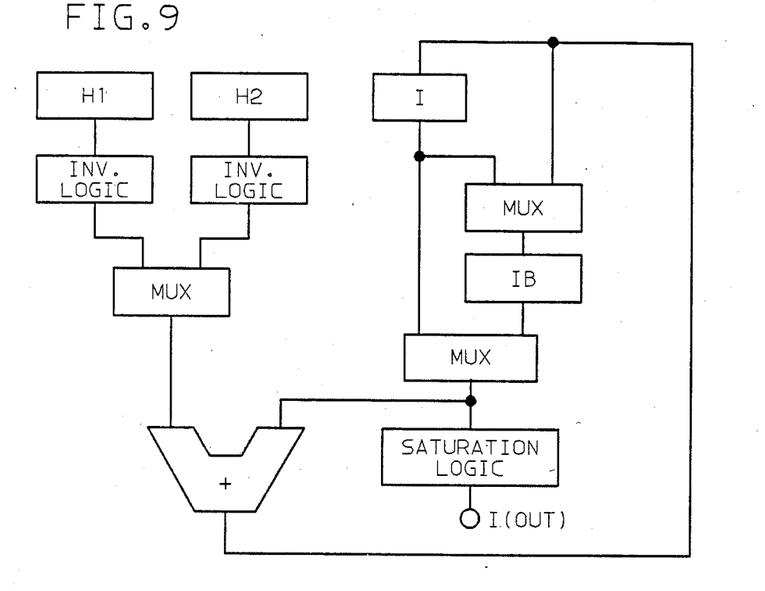
FIG. 9 is a diagram of the intensity computation section of the shading generator of FIG. 4.

The required hardware is given in FIGS. 8 and 9. INCR11, INCR12, INCR21, AND INCR22 are registers which are set up by the microcode. Their contents are fixed for each triangle. D and DB are accumulators. D is used as main accumulator in the "Edge-Shading" mode. DB contains the value of D corresponding to the just-previously computed point. During the "Row-Shading" mode, DB is used as main accumulator. The content of D does not change when in "Row-Shading" mode.

H1 and H2 contains incrementing values for the intensity. They are set up by the microcode. I and IB are accumulators that contain the current intensity. I is used as the main accumulator in the "Edge-Shading" mode. IB contains the value of I corresponding to the just-previously computed point. During the "Row-Shading" mode, IB is used as main accumulator. The content of I does not change when in "Row-Shading" mode.

The saturation logic clamps the output value between the maximum positive number and zero. This logic is needed because due to the quantization of the X and Y axes, a shaded point could be outside the theoretical triangle. The value of the shading plane at this point could be outside the allowed range for intensities.

Algorithm Set-Up

The following procedure is implemented in microcode.

```
PREPSHAD:
  BEGIN
    DXY=(X2−X3)*(Y2−Y1)−(X2−X1)*(Y2−Y3)   /* Coefficient   C      */
    DIX=(I2−I3)*(Y2−Y1)−(I2−I1)*(Y2−Y3)   /* Coefficient (−A)     */
```

```
                    -continued
    DIY=(I2-I1)*(X2-X3)-(I2-I3)*(X2-X1)   /* Coefficient (-B)        */
    IF DXY =0
        THEN "ERROR: INPUT POINTS ARE ALIGNED."
    IF DXY<0
        THEN DO                    /*coeff. C assumed positive       */
            DXY=-DXY
            DIX=-DIX
            DIY=-DIY
            END
S1=0                               /*slope sign in X direction       */
S2=0                               /*slope sign in Y direction       */
IF DIX<0
    THEN DO                        /* negative slope in X dir.       */
        DIX=-DIX                   /* absolute value taken           */
        S1=1
        END
IF DIY<0
    THEN DO                        /* negative slope in Y dir.       */
        DIY=-DIY                   /* absolute value taken           */
        S2=1
        END
H1=FLOOR(DIX/DXY)                  /* Always uses A1-A2 formul.      */
H2=FLOOR(DIY/DXY)
DIX=DIX-H1*DXY                     /* Remainder */
DIY=DIY-H2*DXY                     /* Remainder */
FLAG4=EXOR(FLAGD,EXOR(S1,S2))      /* Used to decide between         */
IF FLAG4=1                         /* B1-B2 or B3-B4 formulation     */
    THEN DIY=DXY-DIY               /* Use B3-B4 formulation          */
INCR11=2*DIX
INCR12=2*(DIX-DXY)
INCR21=2*DIY
INCR22=2*(DIY-DXY)
D=-DXY                             /* Initial value for D.
                                      No need to initialize DB       */
END
```

Algorithm Operation

The following pseudo-program describes the operation of shading generator 43 in FIG. 4.

```
SHADE:
    /* DIR1 and DIR2 indicates direction of new step: */
    /*          DIR1 =  1 : X=X+1                */
    /*          DIR1 =  0 : same X               */
    /*          DIR1 = -1 : X=X-1                */
    /*          DIR2 =  1 : Y=Y+1                */
    /*          DIR2 =  0 : same Y               */
    /*          DIR2 = -1 : Y=Y-1                */
BEGIN
IF (DIR1=0 & DIR2=0) THEN No-Action
H11=H1+1
H21=H2+1
IF S1=1                       /* Slope is negative in X direction*/
    THEN DO
        H1=-H1
        H11=-H11
        END
IF S2=1                       /* Slope is negative in Y direction*/
    THEN DO
        H2=-H2
        H21=-H21
        END
IF FLAG4=1                    /*If B3-B4 formulation selected then*/
    THEN DO                   /*H2 and H21 are exchanged */
        AUX=H2
        H2=H21
        H21=AUX
        END
IF FLAG5=0
    THEN DO                   /* "Edge-Shading" mode     */
        DB=D                  /* Save D & I in back-up registers */
        IB=I
        IF DIR1≠0             /* MOVE in X     */
            THEN DO
                IF D≧0
                    THEN D=D+INCR12
                    ELSE D=D+INCR11
                IF DIR1=1     /* Positive increment in X */
                    THEN IF D≧0
                        THEN I=I+H11
                        ELSE I=I+H1
                IF DIR1=-1    /* Negative increment in X */
                    THEN IF D≧0
                        THEN I=I-H11
                        ELSE I=I-H1
                END
        IF DIR2≠0             /* MOVE in Y   */
            THEN DO
                IF D≧0
                    THEN D=D+INCR22
                    ELSE D=D+INCR21
                IF DIR2=1     /* Positive increment in Y */
                    THEN IF D≧0
                        THEN I=I+H21
                        ELSE I=I+H2
                IF DIR2=-1    /* Negative increment in Y */
                    THEN IF D≧0
                        THEN I=I-H21
                        ELSE I=I-H2
                END
        END
    ELSE DO           /*"Row-shading" mode. Uses back-up regs.*/
        IF DIR1≠0             /* MOVE in X    */
            THEN DO
                IF DB≧0
                    THEN DB=DB+INCR12
                    ELSE DB=DB+INCR11
                IF DIR1=1     /* Positive increment in X */
                    THEN IF DB≧0
                        THEN IB=IB+H11
                        ELSE IB=IB+H1
                IF DIR1=-1    /* Negative increment in X */
                    THEN IF DB≧0
                        THEN IB=IB-H11
                        ELSE IB=IB-H1
                END
        IF DIR2≠0             /* MOVE in Y: Never used.  */
            THEN DO            /* The following could be
                                  implemented if convenient */
                IF DB>0
                    THEN DB=DB+INCR22
```

```
         ELSE DB=DB+INCR21
      IF DIR2=1    /* Positive increment in Y */
         THEN IF DB≧0
                 THEN IB=IB+H21
                 ELSE IB=IB+H2
      IF DIR2=-1   /* Negative increment in Y */
         THEN IF DB≧0
                 THEN IB=IB-H21
                 ELSE IB=IB-H2
         END
      END
END
```

Figure 10:
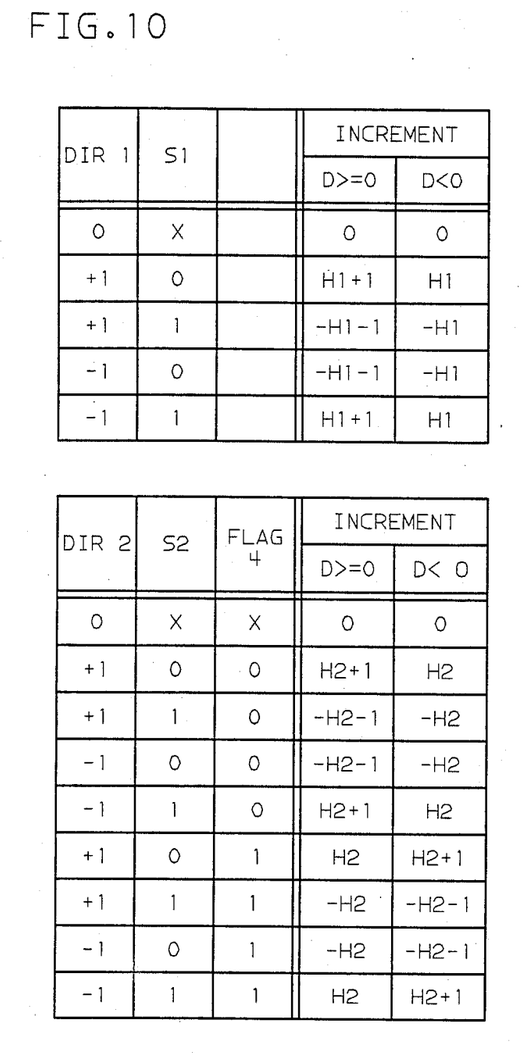
FIG. 10 is a table summarizing the intensity increments as a function of certain initial values set up via microcode.

FIG. 10 is a table that summarizes the intensity increments as a function of the initial values of H1 and H2, S1 and S2 (sign of slopes), DIR1 and DIR2, FLAG4, and D (or DB, in case of "row-shading" mode).

Arithmetic Precision

As mentioned before, the absolute value of coefficient C in the plane equation is equal to twice the area of the triangle (in the X-Y plane) to be shaded. The maximum value for C is, therefore, equal to Nx*Ny, Nx and Ny being the screen size in the X and Y direction respectively. It follows that $$0 \leq INCR11 \leq 2*Nx*Ny$$

$$-2*Nx*Ny \leq INCR12 \leq 0$$

$$0 \leq INCR21 \leq 2*Nx*Ny$$

$$-2*Nx*Ny \leq INCR22 \leq 0$$

The required number of bits for the adder of the decision-taking section of FIG. 8 is then $$\begin{aligned} NBd &= CEIL\ (1[\text{sign}] + 1[\text{adder}] + 1[\text{factor 2}] + \\ &\quad LOG2(Nx*Ny)) \\ &= 3 + CEIL(LOG2(Nx) + LOG2(Ny)) \end{aligned}$$

The most significant bit of the adder output is always the true sign bit of the result (i.e., no overflow will occur). For Nx=Ny=1024, NBd is equal to 23 bits.

The arithmetic precision of the intensity computation section of the shading generator (see FIG. 9) is given by $$NBi = 2 + LOG2(Ni)$$

in which Ni, the number of possible different intensity levels, has been assumed to be a power of two. The number 2 of the above expression comes from the fact that an additional bit is required to handle possible negative numbers, and another one is needed to detect overflows.

Overall Operation

Figure 11:
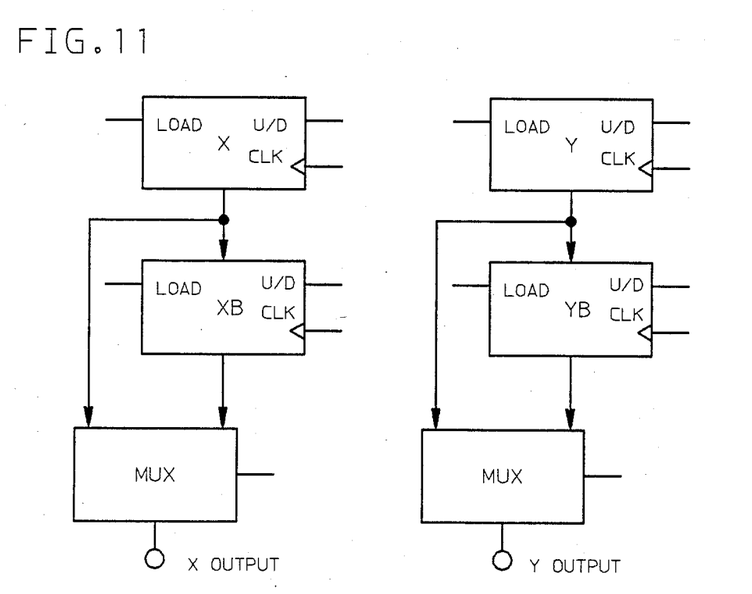
FIG. 11 is a diagram of two sets of up-down counters used in the address generator of FIG. 4.
Figure 12:
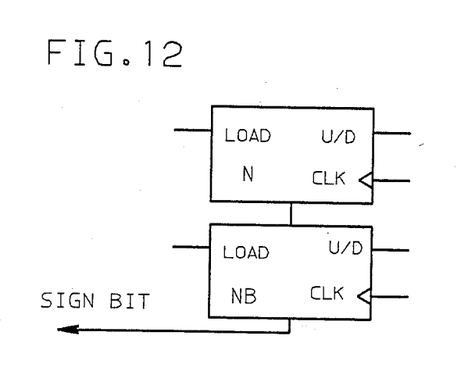
FIG. 12 is a diagram of two registers used in the counter of FIG. 4.

The basic two-dimensional shading generator can be used to shade triangles using the hardware depicted in FIG. 4. Address Generator 44 comprises two sets, one for each coordinate, of two up-down counters (see FIG. 11). Counter 45 of FIG. 4 comprises of two up-down counters with the mission of keeping control of the number of pixels belonging to each row of the triangle (see FIG. 12). Registers X, Y, and N are set up by the microcode. They change their values when in the "edge-shading" mode under the control of Control Logic 40 of FIG. 4. Registers XB, YB, and NB are used mainly during the "row-shading" mode.

The following procedure describes the operation of address generator 44, Counters, and Control Logic 40 of FIG. 4. The sort procedure and the set up of vector generator 41, vector generator 42, shading generator 43, Counters, and address generator 44 are done by microcode.

```
FILL:
    BEGIN
        SORT X            /* Sorts inputs points and computes flags        */
/*      Let (X1,Y1,I1),(X2,Y2,I2),(X3,Y3,I3)
        be the sorted sequence                                             */
        PREPSHAD          /* Set up Shading Generator                      */
        Set up VG 41 (X1,Y1) to (X2,Y2)    "Start-edge" vector              */
        END=0
        END1=0
        END2=0
        SKIP=0
        BSK=1
        V2=0
        IF FLAGA=0        /* Vector Q1Q2 is not horizontal                 */
            THEN DO
                Set up VG 42 (X1,Y1) to (X3,Y3)  /*"End-edge" vector       */
                N=0                              /* hardware counter       */
                END
            ELSE DO                              /* Vector O1Q2 is horizontal */
                N=ABS(X3-X1)
                END2=1
                END
        N=N-1
        CX=X1             /* Hardware X register                           */
        CY=Y1             /* Hardware Y register                           */
        CI=I1             /* Hardware I register                           */
        Write pixel (CX,CY) with intensity (CI)
        DO WHILE END=0    /* Main loop starts here                         */
            NB=N          /* Hardware register loaded                      */
            FLAG5=0       /* Set "edge shading" mode                       */
            IF END1=0     /* vector generator 41 has finished              */
                THEN DO
                    CIB=CI    /* IB and DB registers are                   */
                    DB=D      /* updated                                   */
```

```
              END
    CXB=CX            /* Hardware registers XB and             */
    CYB=CY            /* YB are updated                        */
    DO UNTIL CY changes WHILE END1=0
        STEP vector generator 41
        IF vector generator 41 ends
            THEN END1=0
        STEP shading generator 43   /* Shading Generator step.
                                       Direction given by VG 41 */
    Update CX,CY,CI
    Write pixel (CX,CY) with intensity CI
    IF CX has changed
        THEN N=N−1
    IF CX has changed and no change in CY
        THEN NB=NB−1
    END
    DO UNTIL change of Y coordinate of VG2
        IF END2=1                  /* Set up of vector Q3Q2 needed   */
            THEN DO
                SKIP=1
                IF V2=0 & FLAGB=0    /* Q3Q2 vector not drawn yet and
                                        Q3Q2 vector not horizontal   */
                    THEN DO
                        Set up VG2 (X3,Y3) to (X2,Y2) /*"End-edge"*/
                        V2=1
                        END2=0
                        IF FLAGC=1     /* same slope sign than Q1Q3  */
                            THEN SKIP=0
                        END
        IF SKIP=0
            THEN DO
                Step vector generator 42
                IF vector generator 42 ends
                    THEN END2=1
                IF change in X
                    THEN DO
                        IF V2=1 & FLAGC=0 /*Q3Q2 & diff. slope signs*/
                            THEN DO
                                N=N−1
                                NB=NB−1
                                END
                            ELSE DO
                                N=N+1
                                IF no change in Y
                                    THEN NB=NB+1
                                END
    END
    IF END1=1 & BSK=0
        THEN END=1
    IF END1=1
        THEN BSK=0
    SKIP=0
    FLAG5=1                /* "Row-shading" mode                 */
    DO WHILE NB≧0
        STEP shading generator 43
        IF FLAGE=1
            THEN CXB=CXB+1   /*runs from left to right            */
            ELSE CXB=CXB−1   /*runs from right to left            */
        NB=NB−1
        Write pixel (CXB,CYB) with intensity (CIB)
        END
    END
END
```

Figure 13:
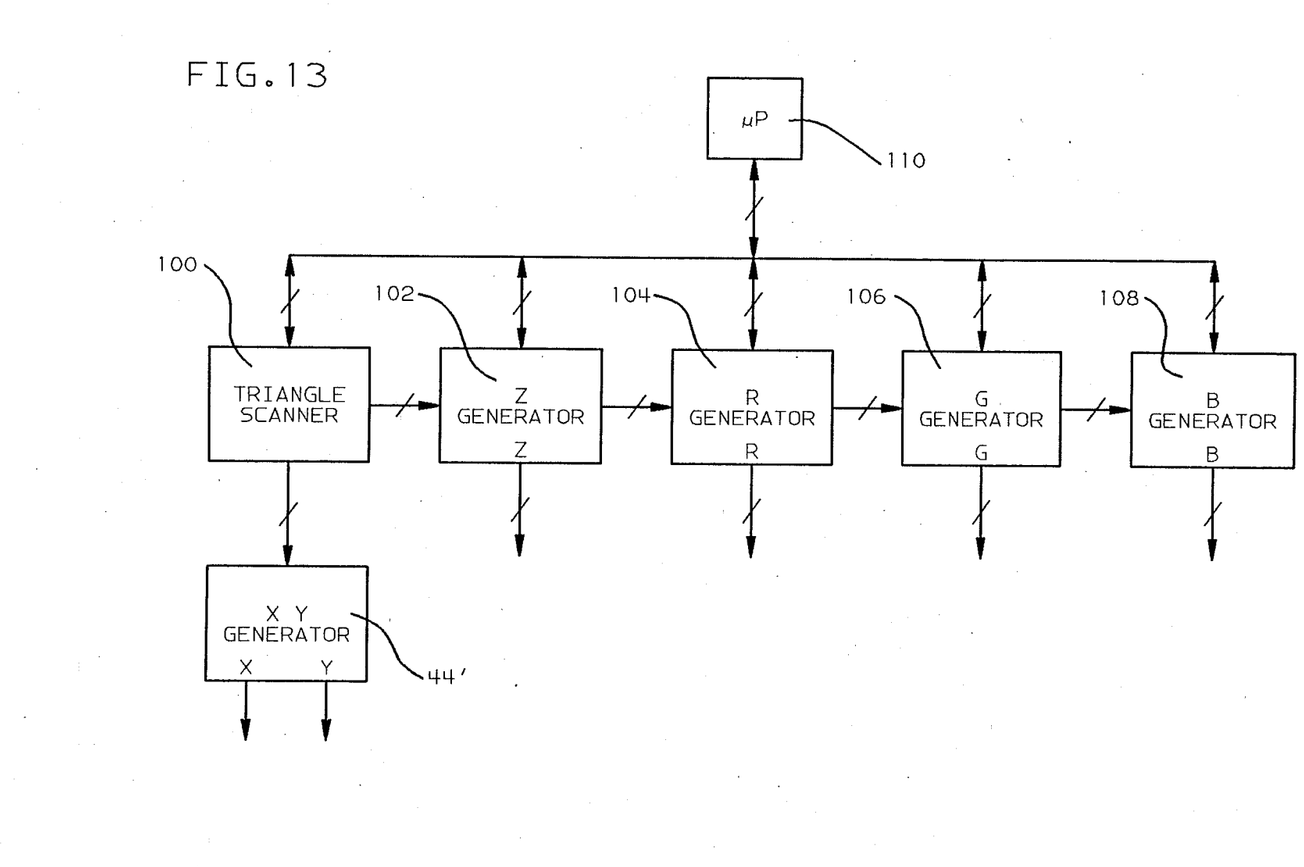
FIG. 13 is a block diagram of a further embodiment of a shading processor.

FIG. 13 shows a block diagram of an embodiment of the invention that comprises an extension of the functions depicted in FIG. 4, and that shows how a microprocessor can be connected to provide control in the implementation of the procedures and algorithms described above. A triangle scanner 100 includes the control logic 40, vector generator VG1 41, vector generator VG2 42, and counter 45 of FIG. 4. Scanner 100 is connected to XY generator 44', which is the same as address generator 44 of FIG. 4. Scanner 100 is also connected to a Z generator 102, red generator 104, green generator 106, and blue generator 108, all as shown.

The sequences performed in generators 102, 104, 106 and 108 are substantially the same. Each is set up, however, with initially with different initial values corresponding to the values at the respective vertices for the respective parametric value generated by that generator.

FIG. 13 also shows how a microprocessor 110 is connected to provide control signals for the procedures and algorithms implemented in connection with these embodiments.

Thus, while the invention has been described with reference to preferred embodiments thereof, it will be understood by those skilled in the art that various changes in form and details may be made without departing from the scope of the invention.

We claim:

1. In a computer graphics display processing system having a memory, a display processor, and a display means for displaying graphics objects, wherein a graphics object is represented in memory by position data corresponding to the positions, in a two dimensional space represented by a first and a second axis, of pels which together make up the graphics objects, and by parametric values corresponding to a display characteristic provided in association with said position data, a method for providing interpolated display characteristic parametric values for each pel on said raster scan display means associated with a graphics object to be displayed, comprising the steps of:

providing position data and parametric value data for a plurality of pels representing selected points on said graphics object for interpolation therefrom to generate the parametric value data for the other pels of said graphics object;

generating, based on said position data of said plurality of pels representing selected points on said graphics object, pel position values for the other pels of said graphics object starting at one of said plurality of pels and moving from one pel to the next in a scanning operation in a first and second selected scanning direction that are parallel to said first and said second axis, respectively;

determining integer values approximating the rate of change of parametric values, an initial accumulated error value, error terms, and error correction terms, such that the error in the parametric value is never greater than 0.5 units, by performing the following steps:

determining first and second integer values approximating the rate of change of the parametric value in said first and second scanning directions;

determining an initial accumulated error value based on said position data and said parametric value data;

determining first and second error terms representing the error introduced by using said first and second integer values as approximations of the rate of change of the parametric value in said first and second directions;

determining first and second error correction terms representing the error correction accomplished by substituting third and fourth integer values approximating the rate of change of the parametric value in said first and second scanning directions, said first and second integer values representing a first integer bound of the actual rate of change of the parametric value and said third and fourth integer values and representing a second integer bound of the actual rate of change of the parametric value in said first and second scanning directions;

wherein said first, second, third and fourth integer values are selected so that the sign of the difference between the second and fourth values is the same as the sign of the difference between the first and third integer values;

generating interpolated parametric value data for each pel generated by said moving from one pel to the next, by taking the parametric value data for a previously determined pel and performing the following steps:

when said each pel is reached from said previously determined pel by moving in said first scanning direction adding to said previously determined parametric value:

said first integer value, if said accumulated error value is negative; or said third integer value, otherwise; and adding to said accumulated error value said first error term if said accumulated error is negative; or said first error correction term, otherwise;

when said each pel is reached from said previously determined pel by moving in said second scanning direction, adding to said previously determined parametric value:

said second integer value if said accumulated error value is negative, or said fourth integer value, otherwise; and adding to said accumulated error value said error term if said accumulated error value is negative, or said second error correction term otherwise; and adding, when said each pel is located anywhere else, a sum determined by representing the path to said each pel located anywhere else as the combination of a move in said first scanning direction and a move in said second scanning direction 2. A computer graphics dislay processing system having a memory, a display processor, and a display means for displaying graphics objects, wherein a graphics object is represented in memory by position data corresponding to the positions, in a two dimensional space represented by a first and a second axis, of pels which together make up the graphics objects, and by parametric values corresponding to a display characteristic provided in association with said position data, including means for providing interpolated display characteristic parametric values for each pel on said raster scan display means associated with a graphics object to be displayed, comprising:

means for providing position data and parametric value data for a plurality of pels representing selected points on said graphics object for interpolation therefrom to generate the parametric value data for the other pels of said graphics object;

means for generating, based on said position data of said plurality of pels representing selected points on said graphics object pel position values for the other pels of said graphics object starting at one of said plurality of pels and moving from one pel to the next in a scanning operation in a first and a second selected scanning direction that are parallel to said first and second axis, respectively;

means for determining integer values approximating the rate of change of parametric values, an initial accumulated error value, error terms, and error correction terms, such that the error in the parametric value is never greater than 0.5 unit, said means for determining including:

means for determining first and second integer values approximating the rate of change of the parametric value in said first and second scanning directions;

means for determining an initial accumulated error value based on said position data and said parametric value data;

means for determining first and second error terms representing the error introduced by using said first and second integer values as approximations of the rate of change of the parametric value in said first and second directions;

means for determining first and second error correction terms representing the error correction accomplished by substituting third and fourth integer values approximating the rate of change of the parametric value in said first and second scanning directions, said first and second integer values representing a first integer bound of the actual rate of change of the parametric value and said third and fourth integer values and representing a second integer bound of the actual rate of change of the parametric value in said first and second scanning directions;

means for generating interpolated parametric value data for each pel generated by such moves, by taking the parametric value data for a previously determined pel, including:

means for adding to said previously determined parametric value when said each pel is reached from said previously determined pel by moving in said first scanning direction:

said first integer value, if said accumulated error value is negative, or said third integer value, otherwise; and adding to said accumulated error value said first error term if said accumulated error is negative, or said first error correction term, otherwise;

means for adding to said previously determined parametric value when said each pel is reached from said previously determined pel by moving in said second scanning direction:

said second integer value if said accumulated error value is negative, or said fourth integer value, otherwise; and adding to said accumulated error value said error term if said accumulated error value is negative, or said second error correction term otherwise; and means for adding, when said each pel is located anywhere else, a sum determined by representing the path to said each pel located anywhere else as the combination of a move in first scanning direction and a move in said second scanning direction.

* * * * *